Patented May 20, 1947

2,420,791

UNITED STATES PATENT OFFICE 2,420,791

DIAZO COMPOUNDS OF THE PYRAZOLONE SERIES

Abby Ware Nies, Bound Brook, N. J., assignor to American Cyanamid Company, New York, N. Y., a corporation of Maine No Drawing. Application September 9, 1944, Serial No. 553,459

14 Claims. (Cl. 260—141)

This invention relates to new diazo compounds derived from 1-(sulfophenyl)-3-substituted-4 amino-5-pyrazolones represented by the following formula:

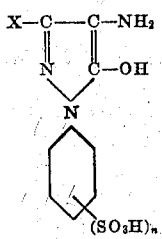

in which X is $CH_3$, COOH, or COO Alk, where Alk stands for an alkyl group and $n$ is 1 or 2. The phenyl nucleus may also carry other substituent groups.

Various 1 - aryl-3-methyl-4-amino-5- pyrazolones are known. However, as far as azo dyestuffs are concerned they have been largely of academic interest because it was thought that they could not be usefully employed. Thus, for example, 1-phenyl-3-methyl-4-amino-5-pyrazolone was extensively studied by A. Heiduschka and O. Rothacker (J. fur Pr. Chem. (2) 84, 534, 1911). They found that when it was attempted to diazotize this compound by the ordinary methods it was oxidized to a mixture of 1-phenyl-3-methyl-4-keto-5-pyrazolone and rubazonic acid. No diazo compound was produced. The authors were able to prepare a diazo solution by special procedures. This was so unstable as to be impractical for producing azo dyes and could only be coupled in acid medium with amines. Alkali appeared to decompose the unstable diazo compound.

The present invention is based on the surprising discovery that when the phenyl group contains sulfonic groups the compounds may be diazotized readily by conventional diazotizing procedures, and what is even more surprising, that the diazo compounds are remarkably stable, can be precipitated from acid or alkaline solutions, and can be stored in the moist or dried state. They couple readily with ordinary coupling components in either alkaline or acid solution.

The remarkable stability of the diazo compounds makes them useful in the production of azo dyes, particularly metallized azo dyes, and opens up a new field of pyrazolone azo colors, many of them not obtainable by any practical alternative procedure, such as the products obtained by coupling to acylacetic arylides and pyrazolones. It is not intended to limit the present invention to any theory and it is not known definitely whether the diazo compounds exist as such or as internal salts with the sulfonic acid group. Throughout the specifications and claims, therefore, the term "diazo compounds" will be used to cover products of diazotization of the amines regardless of whether they actually are diazonium salts, diazotates, diazo-oxides, or internal salts.

While, as has been stated above, it is an advantage of the present invention that the amines can be diazotized by any of the customary diazotizing procedures and require no new technique, I prefer to carry out the diazotization in dilute mineral acid solution with addition of sodium nitrite. This procedure gives the smoothest and best results and is, therefore, the preferred modification. Temperature is not a critical factor, but best results are obtained if the temperature does not exceed about 20° C. This involves no serious problem as it is common in the art for many amines to be diazotized best at low temperatures.

It is quite possible to use the diazo compounds in solution as they are formed, but I prefer to isolate them, which can be effected by salting out with alkali metal salts, such as sodium chloride. The cake obtained is stable, either moist or dried, and may be stored and used when needed.

Some typical amines suitable for production of the diazo compositions of the present invention are 1 - (4' - sulfophenyl)-3-methyl-4-amino-5-pyrazolone; 1 - (3' - sulfophenyl)-3-methyl-4-amino-5-pyrazolone; 1-(2',4'-disulfophenyl)-3-methyl-4-amino-5-pyrazolone; 1-(2',5'-dichloro-4'-sulfophenyl)-3-methyl-4-amino-5-pyrazolone; 1-(4'-sulfophenyl)-3-carboxy-4-amino-5-pyrazolone; 1 - (4' - sulfophenyl) - 3-carboxyethyl-4-amino- 5- pyrazolone; 1-(4'-sulfophenyl)-3-carboxymethyl-4-amino-5-pyrazolone; 1-(4'-sulfophenyl) - 3 - carboxy-n-propyl-4-amino-5-pyrazolone.

The following examples are given to more fully illustrate the invention, and not by way of limitation. All parts are by weight unless otherwise noted.

Example I 142 parts of 1-(4'-sulfophenyl)-3-methyl-4-isonitroso-5-pyrazolone are slurried in 1,500 parts of water. 80 parts of ammonium chloride are added and after cooling to 0° C. by the addition of about 1,000 parts of ice, 7.5 parts of zinc dust are added. The mixture is stirred at 0°–5° C. until reduction is complete. Concentrated hydrochloric acid is then added until the mixture is strongly acid to Congo red test paper. Ice is added to bring the temperature below 5° C. while diazotization is accomplished by addition of 40% sodium nitrite solution to a permanent blue endpoint when spotted on starch iodide paper. The resultant solution is clarified by filtration.

Addition of salt to the clarified solution results in precipitation of yellow needles of 1-(4'-sulfophenyl) - 3-methyl-4-diazo-5-pyrazolone which are isolated by filtration and dried.

The product is a pale yellow solid, readily soluble in water from which it is isolated by the addition of common salt. Its water solutions couple readily with coupling components. In its dry form, it is stable to striking, grinding and moderate temperatures and may be stored in the dark for long periods without deterioration.

It probably has one of the following formulae:

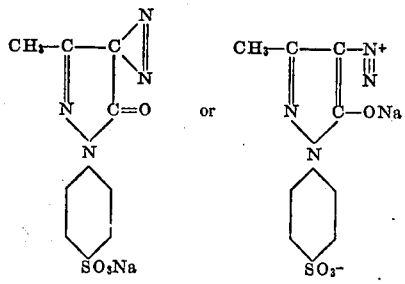

*Example II*

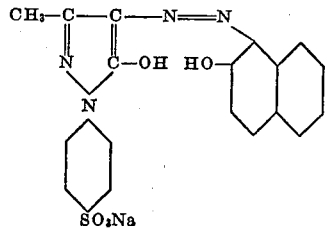

30.2 parts of the diazo compound obtained as described in Example I are dissolved in 300 parts of water and this solution is slowly added to a solution prepared by dissolving 15.1 parts of 2-naphthol in 42 parts of 10% sodium hydroxide solution together with 160 parts of 10% sodium carbonate solution. Coupling is shortly completed whereupon the red-orange dyestuff is precipitated by the addition of 20° Bé. hydrochloric acid to a positive test when spotted on Congo red indicator paper and subsequent addition of common salt. The precipitated dyestuff is isolated by filtration and is dried.

*Example III*

44.6 parts of the dyestuff obtained as described in Example II are heated with 750 parts of water and 160 parts of basic chromic acetate solution containing 7.8 parts of chromium. After a short time, 50 parts of 90% formic acid are added and heating at reflux continued for six hours. Then 25 parts of 20° Baumé hydrochloric acid solution are added and boiling is continued until metallization is complete.

The chromium complex of the dyestuff is filtered directly, washed with water and dried.

*Example IV*

5 parts of the metallized dyestuff from Example III are dissolved in 200 parts of hot water with the addition of 1.0 part of anhydrous sodium carbonate. The solution is diluted with about 40,000 parts of water. 350 parts of dilute sulfuric acid equivalent to 35 parts 66° Baumé sulfuric acid are added. In this solution are placed 500 parts of wool which has been made wet. The solution is boiled for about 1½ hours. Then the wool is removed, washed with water and dried. The goods are dyed a bright rose shade of good fastness to washing and light.

*Example V*

When, instead of beta naphthol, the diazo compound of Example I is coupled with other coupling components by the procedure of Example II, such as 1-naphthol-8-sulfonic acid, 2-naphthol-4-sulfonic acid, acetoacetic arylides, pyrazolones, 2-naphthol-3-carboxylic acid and meta toluylene diamine, azo dyestuffs are formed. These, when metallized with chromium using suitable procedures as described above, yield chromium complexes. These dye animal fibers violet, pink, yellow, yellow-red and brown shades, respectively.

*Example VI*

To 150 parts of water are added 26.9 parts of 1 - (4' - sulfophenyl) - 3 - methyl - 4 - amino - 5-pyrazolone and 29 parts by weight of 20° Bé. hydrochloric acid. After cooling to 10° C. with ice, 6.9 parts of sodium nitrite dissolved in 100 parts of water are added to a permanent blue endpoint when spotted against standard starch iodide paper.

The solution of 1-(4'-sulfophenyl)-3-methyl-4-diazo-5-pyrazolone is then added to a solution of 2-naphthol as described in Example 2. Coupling is similar to Example II. Moreover, when the resultant dyestuff is metallized as described in Example III, a similar metallized product is obtained which dyes wool bright rose shades.

*Example VII*

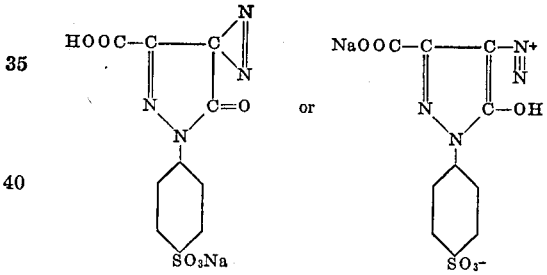

29.9 parts of 1-(4'-sulfophenyl)-3-carboxy-4-amino-5-pyrazolone are dissolved in 200 parts of 4% sodium hydroxide solution. Then 10.7 parts of 10° Baumé hydrochloric acid are added and the temperature of the resultant slurry adjusted to 20° C. by external cooling or heating. Then 10% sodium nitrite solution is added slowly until a permanent positive test is obtained when a drop of the mixture is spotted on standard starch iodide indicator paper. On standing, yellow needles of diazo compound separate.

The 1 - (4' - sulfophenyl) - 3 - carboxy - 4-diazo-5-pyrazolone is isolated by filtration and dried. It is a pale yellow solid, readily soluble in water from which it may be isolated by the addition of common salt. In its dry form it is stable to striking, grinding and may be stored in the dark without deterioration.

Addition of 3.10 parts of the free acid of this diazo compound to a solution of 1.10 parts of resorcinol dissolved in sufficient 4% sodium hydroxide solution to give a positive test when spotted on standard Benzo Azurine indicator paper, gives a chromable azo dyestuff. When isolated in the usual manner, dried, and dyed using the dyeing procedure of Example IV, orange shades are obtained on wool.

The esters of the carboxylic acid products may be diazotized in the same manner. These esters are obtained by condensing the corresponding alkylesters of oxalacetic acid with phenylhydrazine-p-sulfonic acid, coupling it with diazotized sulfanilic acid and reducing the azo compound produced.

Diazotization of the 3-carbalkoxy derivatives of pyrazolones proceeds readily and diazo compounds of good stability are obtained. These products couple to form azo dyestuffs under the conditions described above.

I claim:

1. Diazo compounds of the amines of the formula:

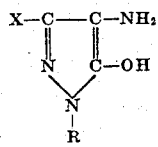

in which R is a sulfophenyl radical and X is a radical selected from the group consisting of $CH_3$, COOH, COO Alk, where Alk stands for a lower alkyl group.

2. Diazo compounds of amines of the formula:

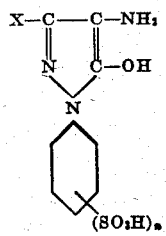

in which $n$ is an integer included in the group consisting of 1 and 2 and X is a radical selected from the group consisting of $CH_3$, COOH, COO Alk, where Alk stands for a lower alkyl group.

3. Diazo compounds of amines of the formula:

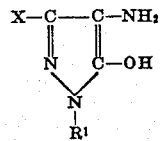

in which $R^1$ is a mono-sulfophenyl radical and X is a radical selected from the group consisting of $CH_3$, COOH, COO Alk, where Alk stands for a lower alkyl group.

4. Diazo compounds of amines of the formula:

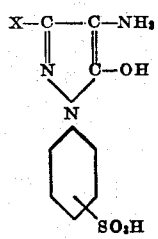

in which X is a radical selected from the group consisting of $CH_3$, COOH, COO Alk, where Alk stands for a lower alkyl group.

5. Diazo compounds of amines of the formula:

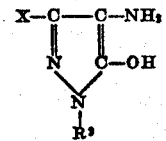

in which $R^2$ is a para mono-sulfophenyl radical and X is a radical selected from the group consisting of $CH_3$, COOH, COO Alk, where Alk stands for a lower alkyl group.

6. Diazo compounds of amines of the formula:

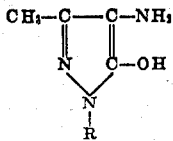

in which R is a sulfophenyl radical.

7. Diazo compounds of amines of the formula:

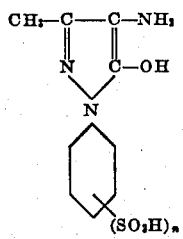

in which $n$ is an integer included in the group consisting of 1 and 2.

8. Diazo compounds of amines of the formula:

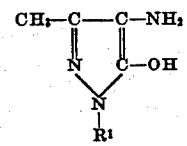

in which $R^1$ is a mono-sulfophenyl radical.

9. Diazo compounds of amines of the formula:

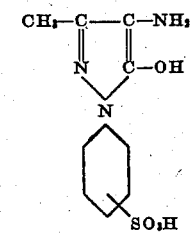

10. Diazo compounds of amines of the formula:

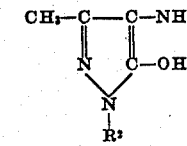

in which $R^2$ is a para mono-sulfophenyl radical.

11. Diazo compounds of 1-(4'-sulfophenyl)-3-methyl-4-amino-5-pyrazolone.

12. A process for preparing azo dyestuffs which comprises diazotizing a 1-(sulfonated phenyl)-3-methyl-4-amino-5-pyrazolone and coupling with a coupling component.

13. A process for preparing azo dyestuffs which comprises diazotizing a 1-(mono-sulfonated phenyl)-3-methyl-4-amino-5-pyrazolone and coupling with a coupling component.

14. A process for preparing azo dyestuffs which comprises diazotizing a 1-(4'-sulfophenyl)-3-methyl-4-amino-5-pyrazolone and coupling with a coupling component.

ABBY WARE NIES.

REFERENCES CITED

The following references are of record in the file of this patent:

Heiduschka et al., Jrl. fur Prak. Chemie, vol. 84, pp. 534–535, 1911.